(12) United States Patent
Maki-Ontto et al.

(10) Patent No.: US 9,831,746 B2
(45) Date of Patent: Nov. 28, 2017

(54) COOLING SYSTEM FOR ELECTRIC ROTOR MACHINE WITH SYMMETRICAL STATOR PASSAGES

(71) Applicant: Ingersoll-Rand Company, Davidson, NC (US)

(72) Inventors: Petri Juhani Maki-Ontto, Espoo (FI); Juha Tuomas Saari, Espoo (FI)

(73) Assignee: Ingersoll-Rand Company, Davidson, NC (US)

( * ) Notice: Subject to any disclaimer, the term of this patent is extended or adjusted under 35 U.S.C. 154(b) by 419 days.

(21) Appl. No.: 14/526,064

(22) Filed: Oct. 28, 2014

(65) Prior Publication Data

US 2016/0118862 A1    Apr. 28, 2016

(51) Int. Cl.
*H02K 9/02* (2006.01)
*H02K 3/24* (2006.01)
*H02K 1/14* (2006.01)
*H02K 1/20* (2006.01)

(52) U.S. Cl.
CPC .............. *H02K 9/02* (2013.01); *H02K 1/148* (2013.01); *H02K 1/20* (2013.01); *H02K 2201/03* (2013.01)

(58) Field of Classification Search
CPC ........... H02K 9/02; H02K 1/20; H02K 1/148; H02K 9/005; H02K 9/04; H02K 9/06; H02K 9/08; H02K 3/24; H02K 2201/03
USPC ............................................. 310/52–65, 260
See application file for complete search history.

(56) References Cited

U.S. PATENT DOCUMENTS

| | | | |
|---|---|---|---|
| 2,221,567 A | 11/1940 | Baudry | |
| 2,285,960 A * | 6/1942 | Fechheimer | H02K 9/197 310/54 |
| 3,502,920 A * | 3/1970 | Chaboseau | H02K 7/088 310/90 |
| 4,683,389 A * | 7/1987 | Readman | H02K 9/19 310/62 |
| 4,994,700 A | 2/1991 | Bansal et al. | |
| 6,740,993 B2 | 5/2004 | Greubel et al. | |
| 7,462,962 B2 | 12/2008 | De Bock et al. | |
| 7,482,725 B2 | 1/2009 | Down et al. | |
| 8,164,225 B2 | 4/2012 | Maduskuie et al. | |

(Continued)

OTHER PUBLICATIONS

European Patent Office Extended European Search Report dated Jun. 28, 2016 cited in couterpart EP Patent Application No. 15191007.2 (8 pages).

*Primary Examiner* — Michael Andrews
(74) *Attorney, Agent, or Firm* — Taft Stettinius & Hollister LLP

(57) ABSTRACT

A symmetrical cooling system for an electric rotor machine that includes a passageway that is positioned between portions of the stator, and which provides a pathway for a cooling medium. Stator ducts positioned within the stator, or portions thereof, are in fluid communication with the passageway. Cooling medium may flow through the stator ducts from the passageway to ends of the stator so that the cooling medium only travels along a portion of the overall axial length of the stator. The symmetrical cooling system also includes an air gap that is positioned between the stator and the rotor, and which receives cooling medium from the passageway at a midsection of the air gap. Cooling medium received at the midsection of the air gap may then flow towards either first or second ends of the stator.

20 Claims, 4 Drawing Sheets

(56) References Cited

U.S. PATENT DOCUMENTS

| | | | |
|---|---|---|---|
| 2007/0138878 A1* | 6/2007 | Down | H02K 3/24 |
| | | | 310/54 |
| 2011/0133580 A1 | 6/2011 | Sugimoto et al. | |
| 2013/0002064 A1* | 1/2013 | De Bock | H02K 1/32 |
| | | | 310/54 |
| 2013/0076169 A1 | 3/2013 | Pal | |
| 2014/0265666 A1* | 9/2014 | Shoykhet | H02K 1/20 |
| | | | 310/59 |

* cited by examiner

COOLING SYSTEM FOR ELECTRIC ROTOR MACHINE WITH SYMMETRICAL STATOR PASSAGES

BACKGROUND

Embodiments of the present invention generally relate to a cooling system for electric rotor machines. More particularly, embodiments of the present invention relate to a symmetrical cooling system for electric rotor machines.

Electric rotor machines, including, for example, electric motors and generators, generate heat that is often associated with electrical and mechanical losses within the electric rotor machines. The amount of heat generated by a particular electric rotor machine may depend on a variety of different factors, including, for example, the size of the load on the electric rotor machine and the frequency of the starting and braking of the electric rotor machine, among other factors.

Cooling of electric rotor machines is often necessary so as to at least attempt to prevent the occurrence of a variety of heat-induced issues, including, for example, short circuits and winding burnout and failure, among other heat related issues that may hinder the operation, and/or shorten the life span, of electric rotor machines. Cooling of electric rotor machines often involves transferring the heat generated by the electric rotor machine to a cooling medium, such as, for example, air. Such heat transfer may often utilize an asymmetrical type cooling system wherein a fan induces flow of cooling air generally across the entire length of an interior region of the electric rotor machine or the entire length of a stator within the interior region. However, such asymmetrical type cooling systems tend to have notable temperature differences between the ends of the electric rotor machine. More specifically, as the cooling medium that entered the first end of the electric rotor machine flows along the length of the electric rotor machine, and accumulates loss energy in the form of heat, the temperature of the cooling medium increases. Thus, the temperature of the cooling medium that arrives at the second end of the electric rotor machine is, typically, notably higher than the temperature the cooling medium has at the first end. As a consequence, the ability of the heated cooling medium at the second end to remove heat is often diminished, which may lead to relatively significant temperature gradients between the first and second ends of the electric rotor machine.

BRIEF SUMMARY

An aspect of the present invention is a symmetrical cooling system for an electric rotor machine having a stator and a rotor. The symmetrical cooling system includes a passageway that is positioned in a midsection of the stator, and which is configured to provide a pathway for the flow of cooling medium into at least a portion of the stator. The symmetrical cooling system also includes first and second sets of stator ducts that are positioned in the stator. The first and second sets of stator ducts are in fluid communication with the passageway and are adapted for cooling medium to flow through at least a portion of the stator. Additionally, the first and second sets of stator ducts extend from the passageway in opposing first and second directions, respectively. The symmetrical cooling system also includes an air gap that is positioned between the stator and the rotor. Additionally, the air gap may be configured to receive a cooling medium at a midsection of the air gap from passageway, and for the cooling medium to flow to opposing first and second ends of the stator.

Another aspect of the present invention is a symmetrical cooling system for an electric rotor machine having a rotor. The symmetrical cooling system includes a stator having a first stator yoke portion, a second stator yoke portion, and a plurality of stator windings. The first stator yoke portion having an axial length this is approximately equal to an axial length of the second stator yoke portion. The symmetrical cooling system may also include a passageway that is positioned between the first and second stator yoke portions, and which is adapted to provide a pathway for the flow of cooling medium. Additionally, the symmetrical cooling system may also include a plurality of stator ducts that are positioned within the first and second stator yoke portions and in fluid communication with the passageway. The plurality of stator ducts are adapted for the flow of cooling medium along the axial length of the first and second stator yoke portions.

Additionally, another aspect of the present invention is a stator for an electric rotor machine. The stator includes a first stator yoke portion having a first get of stator ducts. The first set of stator ducts are configured to deliver cooling medium within the first stator yoke portion from a first end of the first stator yoke portion to a second end of the first stator yoke portion. The stator also includes a second stator yoke portion having a second set of stator ducts. The second set of stator ducts are configured to deliver cooling medium within the second stator yoke portion from a first end of the second stator yoke portion to a second end of the second stator yoke portion. Additionally, the stator includes a plurality of stator windings that are operably connected to the first and second stator yoke portions and a passageway that is positioned at least between the first stator yoke portion and the second stator yoke portion. The passageway is configured to deliver cooling medium to the first and second sets of stator ducts.

Other aspects of the present invention will become apparent by consideration of the detailed description and accompanying drawings.

Figure 1:
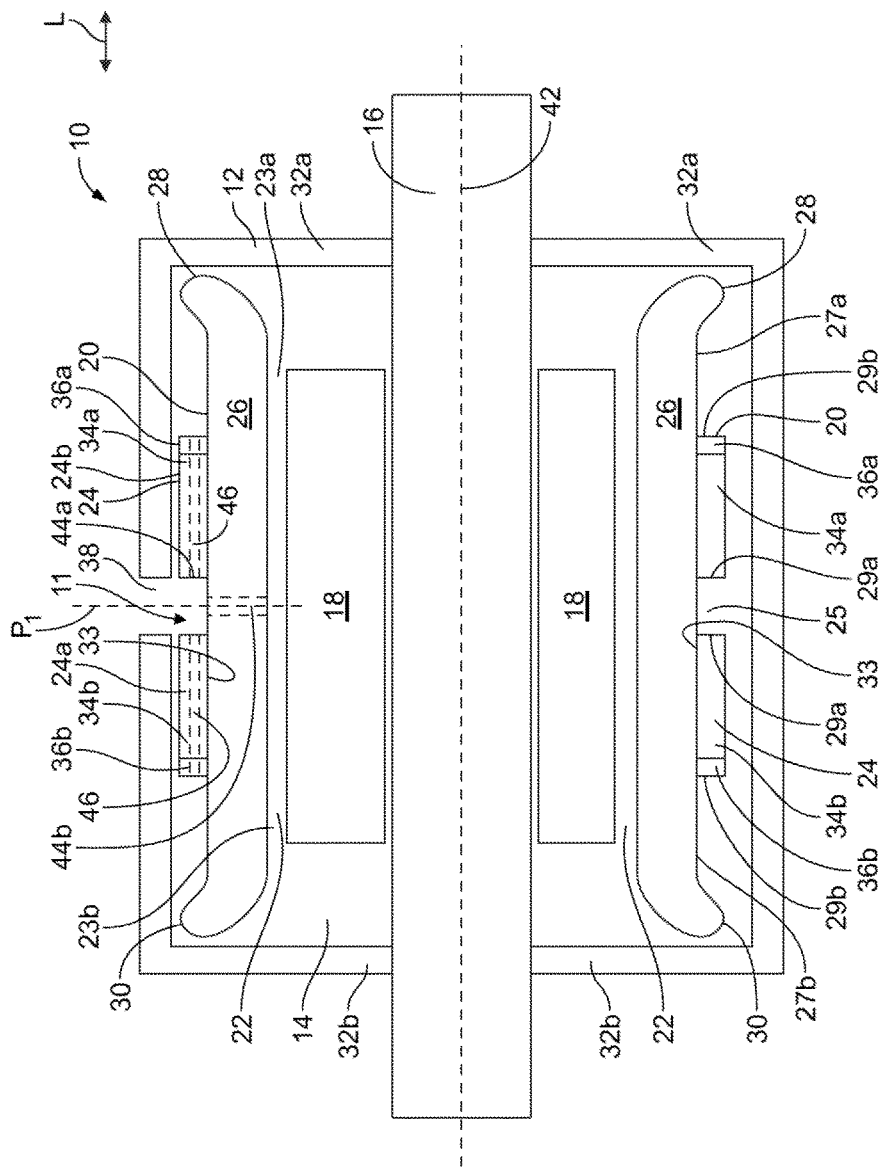
FIG. 1 illustrates a schematic of an electric rotor machine having a symmetrical cooling system according to an embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

FIG. 1 illustrates a schematic of an electric rotor machine 10 having a symmetrical cooling system 11 according to an embodiment of the present invention. The electric rotor machine 10 may be a variety of different types of electric motors and generators, including, but not limited to, induction motors. Further, the electric rotor machine 10 may have a variety of operating parameters and characteristics. For example, according to certain embodiments, the electric rotor machine 10 may be a high speed induction motor, which may operate at a variety of different speeds, including, for example, at speeds in excess of 7,200 revolutions-per-minute (rpm), 15,000 revolutions-per-minute, or 30,000 revolutions-per-minute. Further, for example, according to certain embodiments, the electric rotor machine 10 may be a relatively low voltage induction motor, such as, for example, an induction motors that may be wound for voltages from around 400 volts to 690 volts, among other voltages.

The electric rotor machine 10 includes a housing 12 that generally defines an inner region 14 of the electric motor machine 10. The inner region 14 may have a variety of different shapes and configurations, including, for example, being generally cylindrical. Additionally, the inner region 14 is configured to house a variety of components of the electric rotor machine 10. For example, according to certain embodiments, the inner region 14 is configured to house at least a portion of a rotatable shaft 16 that is operably mounted to a rotor 18. The illustrated electric rotor machine 10 also includes a stator 20 that is separated from the rotor 18 by an air gap 22.

In the illustrated embodiment, the stator 20, which may be supported or otherwise affixed within the inner region 14 of the housing 12, may include a stator yoke 24 and plurality of stator windings 26 that extend from opposing first and second ends 28, 30 of the stator 20. The first and second ends 28, 30 of the stator 20 may be spaced inwardly from opposite sides 32a, 32b of the housing 12. At least a portion of the stator windings 26 may generate heat during operation of the electric rotor machine 10.

The stator yoke 24 may have a variety of different shapes and configurations. For example, according to certain embodiments, the stator yoke 24 may have a generally tubular configuration that generally defines a cavity 35 that receives at least a portion of the rotor 20. Additionally, according to certain embodiments, the stator windings 26 may be at least partially disposed about or in proximity to the stator yoke 24, such as, for example, being disposed about an inner surface 22 of the stator yoke 24. Further, the stator yoke 24 may be constructed from a variety of different materials, including, for example, being constructed from one or more sheets or laminations of electro-magnetic steel plate. Further, according to certain embodiments, the stator yoke 24 may be operably connected to one or more magnets.

Optionally, according to certain embodiments, opposing ends 34a, 34b of the stator yoke 24 may be operably connected to end plates 36a, 36b. According to certain embodiments, the end plates 36a, 36b may provide support for the stator yoke 24. Further, according to certain embodiments, the end plates 36a, 36b may be employed to ensure that at least the stator yoke 24 attains a particular size and/or dimension. In the illustrated embodiment, the end plates 36a, 36b may have a relatively annular shape and are constructed from a non-magnetic material so as to minimize iron losses.

The symmetrical cooling system 11 may include a passageway 40 that is configured to provide a passage for the flow of a cooling medium, such as air, from an area outside of the housing 12 to at least a portion of the inner region 14 of the housing 12. According to the illustrated embodiment, the passageway 40 includes an inlet 38 in the housing 12 and one or more passageway portions 40a, 40b in the stator 20. Further, in the illustrated embodiment, the passageway 40 is generally positioned about a passageway axis $P_1$ that is generally perpendicular to a central axis 42 of the stator 20. However, the passageway 40 may have a variety of different configurations and orientations. Additionally, according to the illustrated embodiment, the passageway 40 is in fluid communication with the air gap 22 that is between the stator 20 and the rotor 18. Further, optionally, the symmetrical cooling system 11 may include a cooling fan that facilitates the flow of the cooling medium into and through the symmetrical cooling system 11, such as, for example, into and/or through at least the passageway 40 and stator 20.

According to certain embodiments, the passageway 40 may be located at approximately a central or midpoint location along an axial length of the stator 20, the axial length being generally in a direction that is parallel to the central axis 42 of the stator 20 (as indicated by the direction in FIG. 1). More specifically, referencing the cross sectional views in FIGS. 1-3, the passageway 40 may be positioned so that portions of the stator 20 that are on opposing sides of the adjacent portion of the passageway 40 are generally symmetrical and/or have approximately equal axial lengths.

The passageway 40 may be provided in a variety of different manners. For example, according to certain embodiments, the stator yoke 24 may comprise two or more separate stator yoke portions 24a, 24b, with each separate stator yoke portion 24a, 24b being separated from another, adjacent stator yoke portion 24a, 24b by a stator gap 25. The stator gap 25 between adjacent stator yoke portions 24a, 24b may provide at least a portion of the passageway 40. Alternatively, according to certain embodiments, at least a the portion of the passageway 40 may be one or more holes, slots, grooves, or other openings that is/are formed or otherwise machined into the stator 20, and more particularly, into the stator yoke 24 and stator windings 26.

Figure 2:
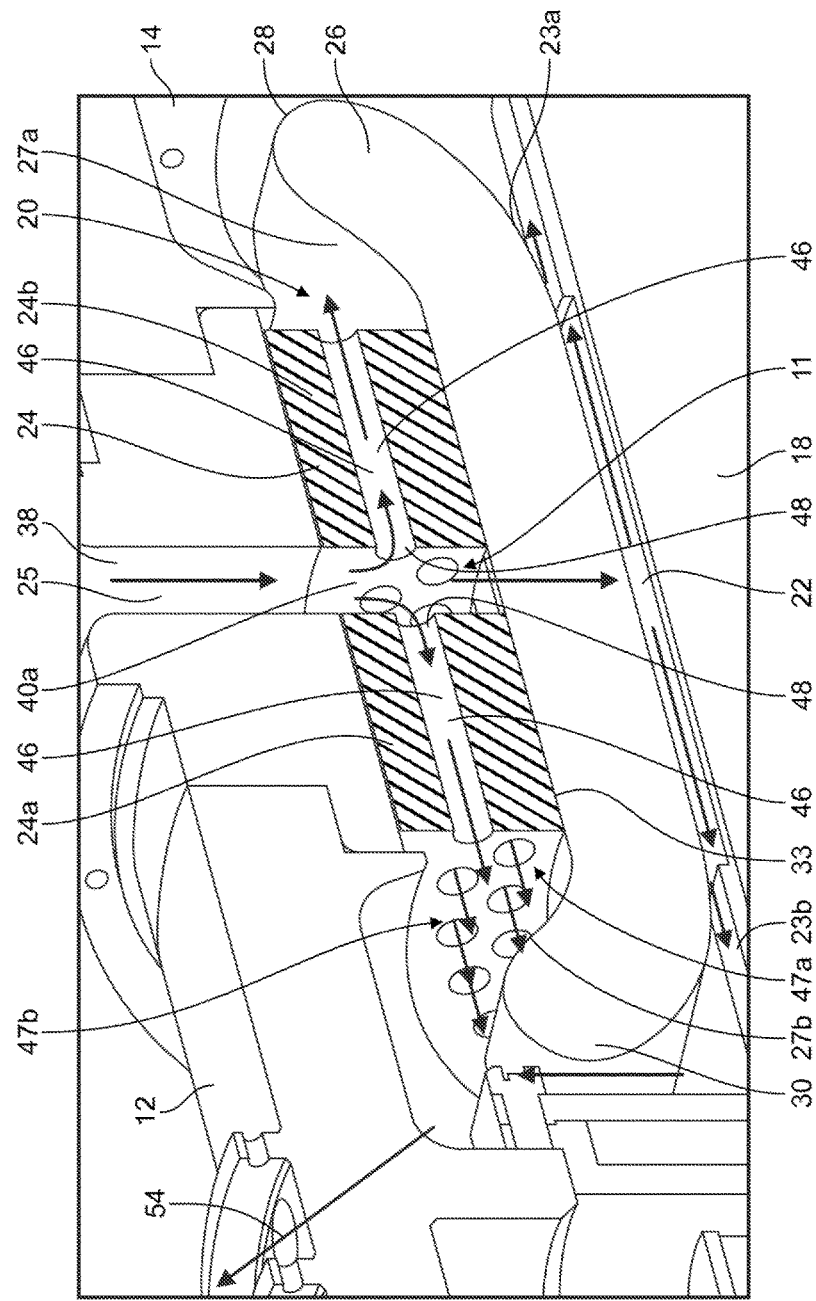
FIGS. 2 and 3 illustrate perspective side cross sectionals view of portions of electric rotor machines having symmetrical cooling systems according to illustrated embodiments of the present invention.
Figure 3:
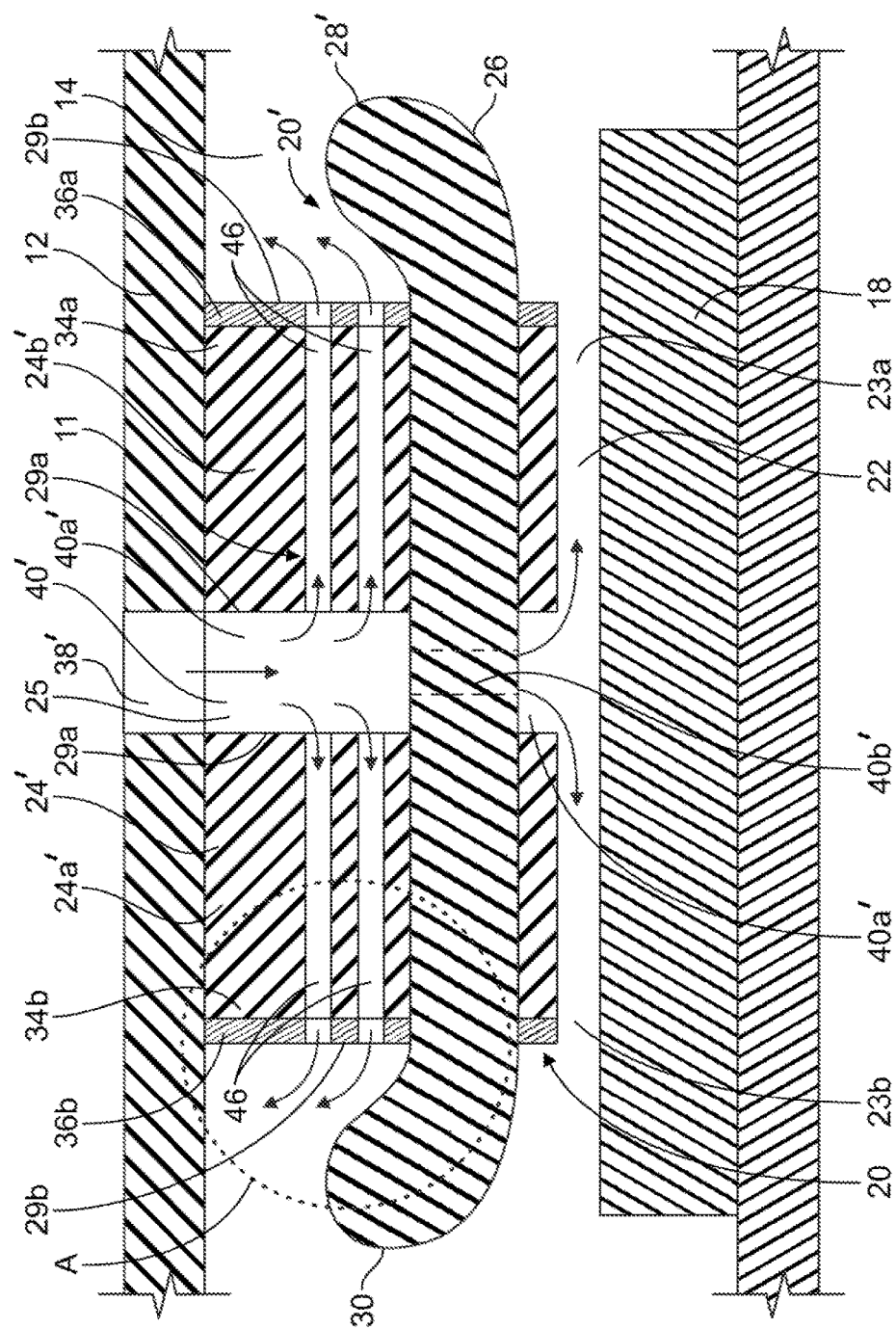

For example, FIGS. 1 and 2 illustrate embodiments in which the passageway 40 has a first passageway portion 40a along the stator gap 25 between two separate stator yoke portions 24a, 24b, and a second passageway portion 40a that extends through, the stator windings 26 and to the air gap 22 between the rotor 18 and the stator 20. In the embodiments shown in FIGS. 1 and 2, configurations of the stator 20 allow for the passageway 40 to transition from the first passageway portion 40a to the second passageway portion 40b generally at the stator windings 26, with the second passageway portion 40b generally terminating at the air gap 22. However, according to other embodiments, the first and second passageway portions 40a, 40b may be segmented or non-continuous. For example, FIG. 3 illustrates a stator 20' having a configuration in which the first passageway portion 40a' between two stator yoke portions 24a', 24b' extends along opposing sides of the second passageway portion 40b. More specifically, in the stator 20' embodiment shown in FIG. 3, the cooling medium may be delivered by an upstream section of the first passageway portion 40a' between adjacent stator yoke portions 24a', 24b' to the second passageway portion 40b' along the stator windings 26', and then from the second passageway portion 40b' to a downstream section of the first passageway portion 40a' between another portion of the adjacent stator yoke portions 24a', 24b', before the cooling medium is delivered to the air gap 22.

The symmetrical cooling system 11 also includes a plurality of stator ducts 46 positioned in the stator 20 that we in fluid communication with the passageway 40, and which are configured to provide a cooling channel through which cooling medium may flow. The stator ducts 46 may have a variety of shapes, configurations, and orientations. Additionally, according to certain embodiments, the stator ducts 46 may be sized so that the flow rate and quantity of cooling medium flowing through the stator ducts 46 both cools the stator 20 and, upon exiting the stator 20, also is able to cool or otherwise reduce the temperature of at least end portions 27a, 27b of the stator windings 26. For example, according to the illustrated embodiment, the stator ducts 46 are a plurality of cylindrically shaped passages in each of the stator yoke portions 24a, 24b that are generally parallel to the central axis 42 of the stator 20 and which extend from first to second ends 29a, 29b of the respective stator yoke portions 24a, 24b. Further, the axial lengths of the stator ducts 46 through each of the stator yoke portions 24a, 24b, such as, for example, the axial length in a direction that is generally parallel to the central axis 42 of the stator 20, may be approximately same for each stator yoke portion 24a, 24b.

Additionally, as shown in FIG. 2, according to certain embodiments, at least some of the stator ducts 46 may be arranged into one or more duct sets 47a, 47b, such as, for example a first duct set 47a that is generally arranged around a first pattern, and a second duct set 47b that is generally arranged about a second pattern. In the illustrated embodiments, the first and second patterns are generally circular patterns, wherein the second pattern has a larger diameter than the first pattern. Further, as shown in FIG. 2, the stator ducts 46 of the first duct set 47a are offset or staggered relative to the stator ducts 46 of the second duct set 47b such that the stator ducts 46 of the first duct set 47a are generally not directly beneath the stator ducts 46 of the second duct set 47b, as shown, for example, in FIG. 2.

The stator ducts 46 include an inlet 48 that is adjacent to the first passageway portion 40a such that at least a portion of the cooling medium flowing through the first passageway portion 40a may pass into the stator ducts 46 through an associated inlet 48, while at least another portion of the cooling medium continues flowing through the first passageway portion 40a and into the second passageway portion 40b and/or into the air gap 22. The stator ducts 46 also include an outlet 50 through which cooling medium may exit the stator 20 yoke portions 24a, 24b. According to the illustrated embodiment, the outlets 50 are positioned at ends 34a, 34b of the stator yoke portions 24a, 24b or in an associated end plate 36a, 36b.

The symmetrical cooling system 11 may be configured to control the relative quantities of cooling medium in the passageway 40 that is delivered to cool the stator 20 through the stator ducts 46, and thus the amount of cooling medium that flows into the air gap 22 between the stator 20 and the rotor 18. Such division of the cooling medium may be based on the parameters of the electric rotor machine 10, including, for example, the anticipated losses between the stator 20 and rotor 18, as well as losses attributable to air friction. For example, according to certain embodiments, the amount of cooling medium that is to flow through the air gap 22 to generally cool the adjacent portion of the stator 20, such as for example, the stator windings 26, and the adjacent portion of the rotor 18, may be increased through a decrease in the size and/or number of stator ducts 46 in the stator yoke portions 24a, 24b.

Figure 4A:
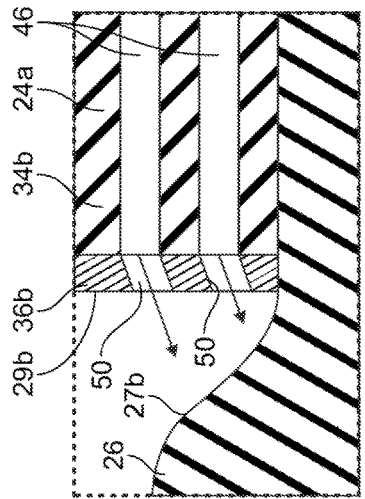
FIGS. 4A-D illustrate enlarge cross sectional views of segment A of FIG. 3 with the illustrated end plate having outlets with various configurations and/or orientations.
Figure 4B:
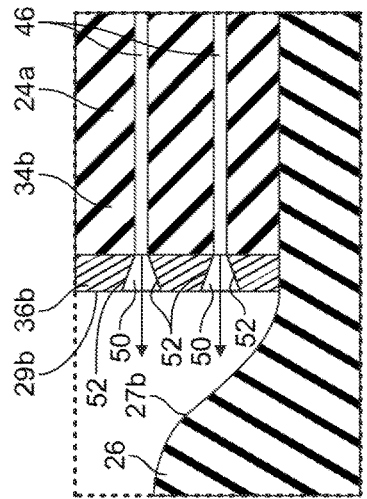
Figure 4C:
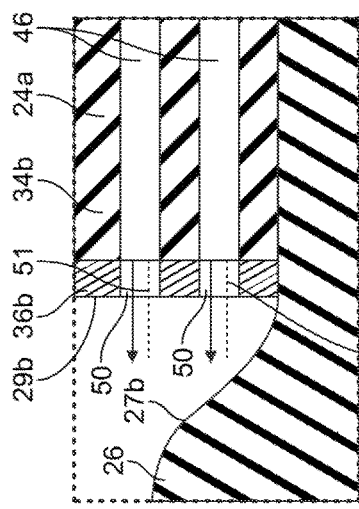
Figure 4D:
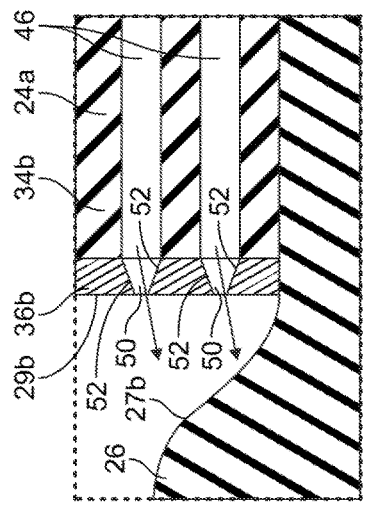

FIGS. 4A-D illustrate various configurations and/or orientations of the outlets 50 of the stator ducts 46. For example, as shown in FIG. 4A, according to certain embodiments, the outlets 50 may be arranged about a central axis 51 that is generally parallel to the central axis 42 of the stator 20. Additionally, according to certain embodiments, the outlet 50 may have a size, such as a diameter, and shape dial is similar to the corresponding size and shape of the adjacent portion of the stator duct 46. Alternatively, the outlets 50 may be oriented to direct the cooling medium flowing oat of the outlets 50 toward a generally adjacent end portion 27a, 27b of the stator windings 26, as shown in FIG. 4B. Such embodiments may at least attempt to direct the cooling medium toward the stator windings 26 so as to use the flow of the cooling medium in impingement cooling of the windings 26. Alternatively, as shown in FIGS. 4C and 4D, the outlets 50 may be arranged to increase the flow rate or reduce the pressure drop of the cooling medium that is exiting the outlets 50, such as through the use of converging or diverging tapering of the walls 52 of the outlets 50.

Similar to the stator ducts 40 the air gap 22 may be configured to provide a cooling channel through which cooling medium may flow. Moreover, the air gap 22 may be sized so that the flow rate and quantity of cooling medium flowing through the air gap 22 is able to cool or otherwise reduce the temperature of at least end a portion of the stator windings 26 and the rotor 18. Further, the symmetrical configuration of the symmetrical cooling system 11 allows the cooling medium to be delivered to a mid-point or location of the air gap 22. The cooling medium is then able to flow from the mid-point location to either end 23a, 23b of the air gap 22, rather than flowing across the entire length of the air gap 22. Cooling medium that has flown through air gap 22 or the stator ducts 46 may subsequently exit the inner region 14 of the housing 12 thorough an outlet orifice 54 in the housing 12.

The flow of cooling medium from a mid-section of the stator 20 and subsequently through the separate, and generally symmetrical portions of the stator 20, such as, for example, through separate and generally symmetrical stator yoke portions 24a, 24b and opposing portions of the air gap 22, allows the cooling medium to flow approximately half the distance that the cooling medium may otherwise flow in comparably sized traditional stators. By reducing the distance that the cooling medium flows through the stator 20, embodiments of the present invention generally prevent the formation of relatively large temperature gradients that are more common in asymmetrical cooling systems. Further, as the total area of the stator 20 through which the cooling medium flows is about half that of comparably sized asymmetrical cooling systems, the cooling medium may flow through the stator ducts 46 at a relatively significantly lower pressure, such as, for example, at pressures that are about four times lower than the pressure needed for the cooling medium to flow through comparably sized asymmetrical cooling systems. Such reductions in the pressure may allow for a reduction in the power needed from an associated cooling fan to facilitate the flow of the cooling medium, thereby reducing both die power consumption requirements for the operation of the cooling fan and the load placed on the cooling fan.

Various features and advantages of the present invention are set forth in the following claims. Additionally, changes and modifications to the described embodiments described herein will be apparent to those skilled in the art, and such changes and modifications can be made without departing from the spirit and scope of the present invention and without diminishing its intended advantages. While the present invention has been illustrated and described in detail in the drawings and foregoing description, the same is to be considered illustrative and not restrictive in character, it being understood that only selected embodiments have been shown and described and that all changes, equivalents, and modifications that come within the scope of the inventions described herein or defined by the following claims are desired to be protected.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A cooling system for an electric rotor machine having a stator and a rotor, the symmetrical cooling system comprising:
   a passageway positioned in a midsection of the stator and configured to provide a pathway for the flow of cooling medium into at least a portion of the stator;
   a first set of stator ducts and a second set of stator ducts positioned in the stator, the first and second sets of stator ducts being in fluid communication with the passageway and adapted for the flow of cooling medium through at least a portion of the stator, the first set of stator ducts extending from the passageway in a first direction, a second set of stator ducts extending from the passageway in a second direction, the second direction being generally opposite to the first direction;
   an air gap positioned between the stator and the rotor, the passageway configured to deliver cooling medium to a midsection of the air gap, the air gap configured to provide a channel for the flow of cooling medium from the midsection of the air gap to opposing first and second ends of the stator; and
   an outlet positioned at a discharge end of each of the stator ducts, at least one of the outlets having angled parallel walls configured to change a direction of flow at the discharge end to direct the cooling medium to impinge on windings of the stator.

2. The cooling system of claim 1, wherein the first set of stator ducts has a first axial length through the stator, and the second set of stator ducts has a second axial length through the stator, and wherein the first axial length is approximately equal to the second axial length.

3. The cooling system of claim 2, wherein the first set of stator ducts extends along one of two, generally symmetrical portions of the stator, and the second set of stator ducts extends along the other of the two, generally symmetrical portions of the stator.

4. The cooling system of claim 3, wherein at least a portion of the passageway is positioned about a passageway axis that is generally perpendicular to a central axis of the stator.

5. The cooling system of claim 4, wherein the first and second directions are generally parallel to the central axis of the stator.

6. The cooling system of claim 5, wherein each of the plurality of stator ducts includes an inlet.

7. The cooling system of claim 5, wherein each of the outlets of the plurality of stator ducts is generally defined by an outlet wall, and wherein the outlet wall is adapted to increase the velocity of cooling medium exiting the outlet.

8. The cooling system of claim 5, wherein each of the outlets of the plurality of stator ducts is generally defined by an outlet wall, and wherein the outlet wall is adapted to reduce the pressure drop of the cooling medium exiting the outlet.

9. A cooling system for an electric rotor machine having a rotor, the symmetrical cooling system comprising:
   a stator having a first stator yoke portion, a second stator yoke portion, and a plurality of stator windings, the first stator yoke portion having an axial length this is approximately equal to an axial length of the second stator yoke portion;
   a passageway positioned between the first and second stator yoke portions and adapted to provide a pathway for the flow of cooling medium; and
   a plurality of stator ducts positioned within the first and second stator yoke portions and in fluid communication with the passageway, the plurality of stator ducts adapted for the flow of cooling medium along the axial lengths of the first and second stator yoke portions; and
   an outlet located proximate a discharge end of each of the stator ducts, the outlet having an angled passageway with a substantially constant flow area directed toward the stator windings.

10. The cooling system of claim 9, further including an air gap positioned between the stator and the rotor, the passageway configured to deliver cooling medium to a midsection of the air gap, the air gap configured to provide a channel for the flow of cooling medium from the midsection of the air gap to opposing ends of the first and second stator yoke portions.

11. The cooling system of claim 9, wherein the passageway includes a first passageway portion and a second passageway portion, the first passageway portion positioned in a stator gap between the first and second stator yoke portions, the second passageway portion extending through the plurality of stator windings.

12. The cooling system of claim 11, wherein the first stator yoke portion is generally symmetrical to the second stator yoke portion.

13. The cooling system of claim 9, wherein at least a portion of the passageway is positioned about a passageway axis that is generally perpendicular to a central axis of the stator.

14. The cooling system of claim 13, wherein each of the plurality of stator ducts includes an inlet and an outlet, and wherein the outlet is adapted to direct the flow of cooling medium exiting the plurality of stator ducts toward the plurality of stator windings.

15. A stator for an electric rotor machine comprising:
   a first stator yoke portion having a first set of stator ducts, the first set of stator ducts configured to deliver cooling medium within the first stator yoke portion from a first end of the first stator yoke portion to a second end of the first stator yoke portion;
   a second stator yoke portion having a second set of stator ducts, the second set of stator ducts configured to deliver cooling medium within the second stator yoke portion from a first end of the second stator yoke portion to a second end of the second stator yoke portion;
   a plurality of stator windings operably connected to the first and second stator yoke portions;
   a passageway positioned at least between the first stator yoke portion and the second stator yoke portion, the passageway configured to deliver cooling medium to the first and second sets of stator ducts; and an outlet having parallel walls configured to change a direction of flow of the cooling medium relative to the flow upstream in the passageway.

16. The stator of claim 15, wherein the first end and the second end of the first stator yoke portion are separated by a first distance, and wherein the first end and the second end of the second stator yoke portion are separated by a second distance, and wherein the first distance is approximately equal to the second distance.

17. The stator of claim 15, wherein the first set of stator ducts include an inlet and an outlet, and wherein the outlet is adapted to direct the flow of cooling medium exiting the outlet toward the plurality of stator windings.

18. The stator of claim 17, wherein the passageway includes a first passageway portion and a second passageway portion, the first passageway portion positioned between the first and second stator yoke portions, the second passageway portion extending through the plurality of stator windings.

19. The stator of claim 17, wherein the first and second stator yoke portions each include an end plate, and wherein the outlet is positioned in the end plate.

20. The stator of claim 19, wherein the outlet is generally defined by an outlet wall, and wherein the outlet wall is adapted to either reduce the pressure or increase the velocity of cooling medium exiting the outlet.

* * * * *